United States Patent
Corn et al.

[15] 3,670,120
[45] June 13, 1972

[54] HORN ACTUATING MEANS

[72] Inventors: Prentice R. Corn; Wallace A. Gebhardt, both of Logansport, Ind.

[73] Assignee: Switches, Inc.

[22] Filed: Jan. 11, 1971

[21] Appl. No.: 105,357

[52] U.S. Cl. ...................................................200/61.55
[51] Int. Cl. ........................................................H01h 9/00
[58] Field of Search ............200/61.54, 61.55, 61.56, 61.57; 74/552, 558.5

[56] References Cited

UNITED STATES PATENTS

| | | | |
|---|---|---|---|
| 2,729,713 | 1/1956 | Berner et al. | 200/61.54 |
| 3,517,145 | 6/1970 | Wallace | 200/61.55 |
| 3,544,746 | 12/1970 | Wolf et al. | 200/61.57 |

Primary Examiner—Robert K. Schaefer
Assistant Examiner—M. Ginsburg
Attorney—Dressler, Goldsmith, Clement & Gordon

[57] ABSTRACT

A horn actuating mechanism for actuating elongated spaced metal strip switches forming part of the steering wheel of an automobile. The actuating mechanism includes a flexible cover cooperating with a base supporting a pair of switches that extend in opposite directions from a central portion of the steering wheel with the cover having a rigid plate connected at the center thereof. The rigid plate has free ends that overlie the inner ends of the respective switches and the plate has projections extending towards the strips so that a force applied adjacent the center of the cover will actuate at least one of the switches.

In addition, the plate is releasably secured to the cover through an emblem which prevents relative movement between the respective elements.

14 Claims, 5 Drawing Figures

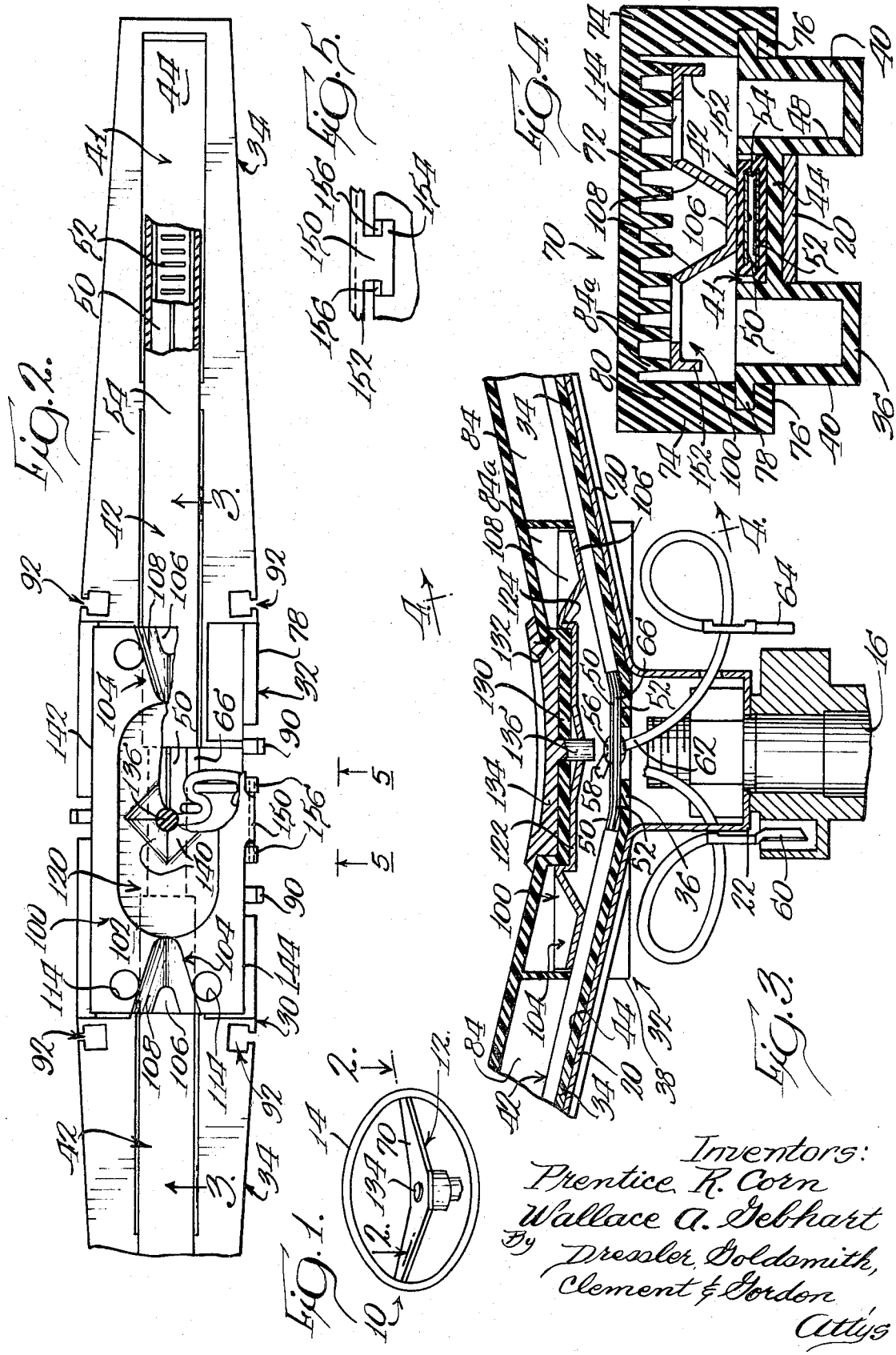

HORN ACTUATING MEANS

BACKGROUND OF THE INVENTION

The present invention relates generally to elongated switches and more particularly to an improved actuating mechanism for such switches.

With recent emphasis on safety and the requirement for resilient padding in the areas surrounding the operator's compartment of the vehicle, manufacturers have tended to eliminate the conventional type of horn actuating mechanism located at the center of the steering wheel and overlying the upper end of the steering column. Thus, in recent years, manufacturers have replaced the circular central horn button with various types of actuating means. One type of actuating means incorporates elongated switches that consist of first and second elongated metal strips which are normally held in spaced relation to each other and are flexed into engagement with each other by the application of a force to one of the strips. In order to eliminate any protrusions extending from the steering wheel, the actuating mechanism for the strip switches is in the form of an inherently resilient cover having a substantially flush surface and having some means cooperating with one of the strips of the switch so that deformation of the cover will actuate the switch.

One such arrangement which has been proposed is to utilize two elongated strip switches that overlie the spokes of the steering wheel and are actuated by an inherently resilient cover located above the switches. The respective strips of the respective switches are normally interconnected at the center of the steering wheel and have suitable insulating means along the center thereof to prevent contact between the two strips.

With such an arrangement, deflection of the resilient cover will also cause deflection of the upper strip into engagement with the lower strip to complete the circuit to ancillary equipment, such as a horn.

While such an arrangement has proven satisfactory to provide the necessary padding in the area of the steering wheel and also to eliminate protrusions extending above any isolated areas in the steering wheel, one serious drawback with an arrangement of this type is that the horn will not be actuated when a force is applied to the center portion of the cover which overlies the center of the steering wheel. Since switching mechanisms of this type are intended for use in electrical circuits under emergency conditions, they require ready availability, rapid response and the capability of being actuated without any thought being given by the operator of the vehicle. Thus, the switch actuators heretofore known prevent a serious problem since they require the operator to make a decision as to where the actuating force will be applied when the horn is to be energized.

SUMMARY OF THE INVENTION

The present invention contemplates a horn actuating mechanism for an elongated switch consisting of first and second elongated strips that are electrically insulated from each other adjacent the center thereof and in which an application of force in any location on the surface of the switch will produce engagement between the respective strips and complete an electric circuit.

According to the present invention, an electrical switching mechanism consists of a base having a central portion and a plurality of circumferentially spaced radial arms extending from the central portion with first and second conductive strips of an elongated switch normally held in spaced relation in the arms and adapted to be flexed into engagement with each other to complete an electric circuit. The respective strips have insulating means permanently spacing the strips in the central portion while an integral flexible actuating cover overlying the base is adapted to be deformed into engagement with one of the strips and flex the strips into engagement with each other thereby completing the circuit. The integral flexible cover has a rigid flat plate secured to the under surface thereof with portions of the plate extending beyond the insulating means and having projections extending towards the strips so that application of force to the portion of the cover overlying the central portion will actuate the switch through displacement of the elongated rigid plate.

According to an aspect of the invention, the rigid plate is in the form of a substantially flat thin sheet of metal of uniform thickness defining a main body portion having integral projections deformed from the body portion which produce surfaces that extend substantially parallel to and are longitudinally aligned with the respective strips adjacent the end portions of the plate. In addition, the central portion of the plate has a substantially oval portion deformed from the main body thereof to the side upon which the projections are formed and the cover has a corresponding portion offset from the main body thereof which is received into the recess in the plate and defines a second recess on the exposed surface of the cover. An emblem is received in the second recess and has a pin projecting through the cover which is releasably connected to the plate to connect the emblem and the plate to the cover.

In its specific embodiment, the base is adapted to be connected to the spokes extending from the central portion of the steering wheel with a steering rim connected to the outer end thereof. The base and the spokes have a configuration where the spokes extend at an angle relative to the axis of the steering wheel and the central portion is substantially flat and extends perpendicular to the axis of the wheel while the arms are two in number and extend from the base at substantially 180° locations.

According to a further aspect of the invention, the plate is substantially rectangular in configuration with the projections formed on opposite ends thereof and a tab extending from one edge of the plate. The tab cooperates with the base to define a pivot for the plate when an actuating force is applied adjacent the opposite edge of the plate. With such an arrangement, the horn incorporated into the electric circuit can be actuated by applying force to any portion of the exposed surface of the actuating cover. When the force is applied on the central portion of the base, the force is transmitted through the rigid plate to the conductive strip at a location spaced from the insulating means between the strips to complete the circuit.

BRIEF DESCRIPTION OF SEVERAL VIEWS OF DRAWINGS

FIG. 1 is a perspective view of the upper end of a steering wheel having the electrical switching mechanism of the invention incorporated therein;

FIG. 2 is a fragmentary plan view, partially in section and taken generally along line 2-2 of FIG. 1 with the actuating cover removed;

FIG. 3 is a transverse section taken generally along line 3—3 of FIG. 2;

FIG. 4 is a sectional view taken generally along line 4—4 of FIG. 3; and

FIG. 5 is a fragmentary side elevation as viewed generally along line 5—5 of FIG. 2.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings discloses a steering wheel generally designated by the reference numeral 10 having a switch mechanism, generally designated at 12, supported thereon. The steering wheel includes a rim 14 connected to a steering post 16 (FIG. 3) by at least two spokes 20 extending in opposite directions from the central hub portion 22. The switch mechanism is supported on the spokes by suitable means, such as screws (not shown).

According to the present invention, the switch mechanism 12 is designed and constructed so that an application of an actuating force to any portion of the upper surface of the actuating mechanism 12 overlying the switch, to be described later, will complete the circuit to ancillary equipment, such as a horn, incorporated into the electric circuit.

For this purpose, the switch actuating mechanism of the present invention includes a base 30 having a central portion 32 and a plurality of circumferentially spaced radial arms 34 extending from the central portion 32. The central portion has a lower flat wall 36 having vertical walls 38 extending upwardly from opposite ends of the lower wall 36 and side walls 40 extending upwardly from edges of the lower wall 36 to define a substantially rectangular cup-shaped opening.

The arms 34 of the base extend radially from the central portion 32 and, in the illustrated embodiment, extend upwardly at a small acute angle relative to the flat wall 36. Each of the arms 34 has a recess 41 defined therein which receives an elongated switch 42. An inspection of FIGS. 3 and 4 reveals that the lower wall 44 of the recess 41 continues beyond the vertical end walls 38 of the central portion 32 and ultimately merges with the flat wall 36. To provide a rigid structure between the central portion of the base and the arms 34, the central portion has further vertical walls 48 extending upwardly from the lower wall 36 and being integrally joined intermediate the upper and lower ends with the lower wall 44.

The respective elongated switches 42 are identical in construction and each includes first and second conductive, elongated, resilient metal contact strips 50 and 52 normally supported in spaced relation in a tubular casing 54 received in the recess 41.

The inner end of the respective metal contact strips extend beyond the inner end of the tubular casing 54 and the first strips 50 are interconnected along their adjacent ends by suitable means, such as a solder connection 56. A wire 58 is likewise soldered to the first strips 50 and extends from the central portion of the base 30 with a terminal 60 on the free end of the wire for connection into an electric circuit having auxiliary equipment therein, such as a horn. Likewise, the lower or second conductive strips 52 are soldered to each other and to a wire 62 which leads from the base and has a terminal 64 on the free end thereof. The conductive metal strips 50 and 52 have insulating means 66 interposed between the exposed portions thereof to provide a permanent spacing between the strips in the central portion of the base.

The electrical switching mechanism 12 further includes an integral flexible actuating cover 70 overlying the base 30 and adapted to be deformed to deflect one of the strips and cause engagement of the strips, completing the electric circuit to the horn.

The cover 70 includes an upper wall 72 defining a substantially flat surface and having wall 74 depending from the peripheral edge thereof with an inwardly directed lip 76 on the lower end of the wall 74. The cover also has a plurality of longitudinally extending transversely spaced ribs 84 and 84a integral with and depending from the lower surface of the wall 72. The inwardly directed lip 76 and the lower edge of the ribs 84 cooperate to define a recess for receiving the peripheral edge of the respective arms or end portions 34. To connect the cover to the central portion of the base, reinforcing means 80 extending inwardly from the depending wall 74 by thickening of the wall 74 in the area of the central portion of the base to provide a recess for receiving the projecting portion 78 extending outwardly from the vertical walls 40.

To further insure that the cover is securely maintained on the base, the projection 78 is cut away at selected locations and the base has L-shaped legs 90 (FIG. 2) integral with the base and cooperating with the walls 40 to define a recess receiving a reduced portion of the wall 74. In addition, the base has four slots 92 adjacent the four corners of the base for receiving projections (not shown) integral with the cover.

The lower edges of integral depending flexible ribs 84 are in engagement with the upper surface of the casing 54 such that deflection of the cover will cause the strips 50 and 52 to be forced into engagement with each other to complete the electric circuit to the horn.

While such an arrangement has proven satisfactory for completing the circuit when a force applied to the cover along the arms thereof, the application of a force to the center portion of the cover in the area overlying the insulating means 66, will not cause the contact strips to engage each other. Thus, the operator must give some thought as to where the application of force is being applied to actuate the switch. As was indicated above, the switching mechanism is intended for use in electric circuits under emergency conditions and must be readily actuated without any time lapse for determining where the application of force to the switch is to be applied.

Thus, according to the present invention, the cover incorporates means for actuating at least one of the switches when the application force is applied to the central area of the cover which overlies the insulated portion of the contact strips such that an application of force to any area of the cover will complete the circuit to the horn. This latter means is in the form of a rigid plate 100 which is carried by the cover 70 and overlies the central portion of the base 30. The elongated substantially rectangular rigid plate 100 has a substantially planar main body portion 102 with means 104 on opposite ends thereof for respectively engaging one of the switches to produce deflection of one of the strips when a force is applied to the center of the cover overlying the plate 100. The means 104 is in the form of projections which are formed by deforming the main body of the plate to produce a wall 106 which extends substantially parallel to the switch 42 and which is integrally joined to the main body of the plate by a side wall 108. In order to allow for ready deformation of the main body of the plate 100 to produce the respective projections 104, the plate preferably has a pair of openings 114 adjacent each end thereof which allow for the deformation of the metal of the plate.

According to a further aspect of the invention, the plate 100 and cover 70 are interconnected in a manner to prevent relative movement between the two and at the same time provide an attaching means for an emblem supported on the cover. For the purpose, the central portion of the plate 100 is deformed to define a substantially oval or non-circular recess 120 which has a flat lower wall 122 and a continuous substantially vertical wall 124. The cover 70 has a central portion 130 which is laterally offset towards the plate and is received into the recess 120 in the plate. The laterally offset portion 130 of the cover defines a second recess 132 that is of substantially the same configuration as the first recess and receives an oval emblem 134 therein.

In order to interconnect the emblem, cover and plate, the emblem 134 has an element or pin 136 extending through the cover and plate with releasable latch means on the plate cooperating with the element to releasably retain the plate, cover and emblem in an assembled relation. The releasable latch means includes a plurality of circumferentially spaced tabs 140 (FIG. 2) deformed from the plate 100 and having free edges defining an opening for receiving and engaging the pin 136. Thus, the emblem, cover and plate can readily be connected by aligning the portions 120 and 130, as well as the emblem and forcing the pin 136 into the opening defined by the tabs 140. The angular relation between the tabs and the axis of the opening (see FIG. 3) will securely lock the two elements together.

As will be appreciated from the above description, if a force is applied at any location between the two projections 104, one or both of the projections will engage and cause deflection of the switch 42 to complete the circuit and actuate the horn. With the arrangement described above, the application of an actuating force to most any place in the area in the plate will cause the circuit to be completed. However, it has been found that in some extreme instances where the application of force is applied along either of the edges 142 and 144 of the substantially rectangular plate, the restricted amount of movement of the plate would not be sufficient to cause actuation of the switch.

Thus, according to another aspect of the invention, means are provided adjacent one edge of the plate 144 which cooperate with the base 30 to define a pivot for the plate when an actuating force is applied adjacent the opposite edge 142. The pivot means includes a tab 150 depending from and integral with the downwardly depending edge portion 152 on the plate with the lower portion of the tab having outwardly extending legs 154. The outwardly extending legs 154 extend below integral projections 156 that extend outwardly from the vertical wall 40 of the central portion 32 of the base 30. The dimensioning and arrangement of the cover 70 including the depending ribs 84 and central ribs 84a as well as the plate and the base is such that the plate will be normally maintained in a position where the outwardly projecting legs 154 are in engagement with the projections or tabs 156 extending from the base 32. Thus, when a force is applied to the plate adjacent the opposite edge 142, the cooperation between the tabs 156 and legs 154 will produce a pivot axis for the plate thereby insuring actuation of one of the switches 42 with the application of a minimum amount of force adjacent the edge 142. While only one pivot has been shown adjacent the edge 144, it will be appreciated that the opposite edge 142 could likewise have a corresponding pivot so that application of force adjacent the edge 144 would produce the same results.

However, it has been determined that the angular position of the steering post relative to the operator makes is extremely unlikely that a force will be applied only to the lower portion of the cover at the center thereof. Thus, only one pivot means has been shown and has been located adjacent the lower edge of the base and plate.

Thus, it will be appreciated that the present invention provides a simple and inexpensive expedient for insuring that the circuit to the horn will be completed whenever the force is applied at any location on the exposed surface of the cover 70 located between opposite ends of the switches. The construction and design of the plate 100 is such that a very thin plate of substantially uniform thickness may be utilized and may readily be deformed by well-known methods to produce the central deformed portion 122 and the outer end deformed portions 104. The deformation of a flat metal sheet to the configuration shown, including the downwardly depending flanges 152 adjacent opposite edges of the plate, provides a large amount of reinforcement for the plate so as to be able to absorb large shock loads without deforming the plate.

While the actual mechanism has been shown in connection with a steering wheel having only two spokes which extend substantially 180° from a central steering post, it will be appreciated that the invention could be readily incorporated into a steering wheel having any number of spokes. Thus, the base could be designed to have a central portion and a plurality of circumferentially spaced radial arms extending from the central portion at any angular spacing with a switch 42 in each of the arms and a correspondingly configured plate having depending projections aligned with each of the switches. For example, if a steering wheel had four spokes, each of the remaining two edges 142 and 144 could likewise have the integral depending projections or means 104 defined therein and overlying a switch in the remaining two arms of the base so that an application of force at any area in the central portion of the cover, would actuate one of the switches to complete the electrical circuit.

We claim:

1. An electrical switching mechanism comprising a base having a central portion and a plurality of circumferentially spaced radial arms extending from said central portion; an elongated switch including first and second conductive strips normally held in spaced relation in said arms and adapted to be flexed into engagement with each other to complete an electric circuit; insulating means permanently spacing said strips in said central portion; an integral flexible actuating cover overlying said base with a central portion overlying said insulating means, said cover adapted to be deformed to flex said strips into engagement with each other; and a rigid plate between said cover and said base in said central portion, said plate having portions extending beyond said insulating means, said portions having means extending towards said strips so that application of force to a portion of the cover overlying said central portion will cause said means to flex said strips into engagement and thereby complete said circuit.

2. The combination as defined in claim 1, in which said plate includes a main body and said last means includes projections extending from said main body of said plate.

3. The combination as defined in claim 2, in which said projections are formed by deforming said main body towards said strips to produce surfaces extending parallel to respective strips of said switche.

4. The combination as defined in claim 1, further including connecting means between said plate and said cover comprising means defining a recess in said plate with said cover having a cooperating portion received in said recess and defining a second recess; an emblem received in said second recess and having an element extending through said cover and said plate; and releasable latch means on said plate cooperating with said element to releasably retain said plate, cover and emblem in assembled relation.

5. The combination as defined in claim 4, in which said element is a pin extending through an opening in said plate and said releasable latch means includes a plurality of circumferentially spaced tabs deformed from said plate and having free edges defining said opening and engaging said pin.

6. The combination as defined in claim 5, in which said emblem is substantially oval in configuration and said recesses have a configuration corresponding substantially to this configuration of said emblem to prevent relative movement between said emblem, said cover and said plate.

7. The combination as defined in claim 1, and further including cooperating means between one edge of said plate and an adjacent edge of said base and defining a pivot for said plate when a force is applied adjacent an opposite edge of said plate.

8. The combination as defined in claim 1, in which said plate has a substantially planar body portion of substantially uniform thickness having first and second portions deformed from said body portion to define said last means and a central portion deformed to define a substantially oval recess, said first and second portions having planar exposed surfaces respectively extending parallel to the respective strips and said cover has a central portion laterally offset towards said plate and received in said recess, said laterally offset central portion defining an exposed second recess, and an emblem received in said second recess and having a portion cooperating with said plate to interconnect said cover and said plate.

9. The combination as defined in claim 1, and further including a steering wheel including a rim connected to a central hub by spokes and in which said base is connected to said spokes.

10. In an electric circuit having a plurality of elongated switches extending in a plurality of directions from a common center, each switch including first and second elongated, superposed, substantially flat strips normally spaced from each other and adapted to be deflected into engagement with each other, said first and second strips being respectively interconnected adjacent said center; insulating means between said strips adjacent said center; an actuating plate having a substantially main body portion overlying said common center and having free ends extending beyond said insulating means and overlying the respective switches; projection means depending from said main body portion adjacent respective ends and aligned with the respective switches; and means for supporting said plate above said switches for universal movement such that application of a force to said plate will cause one of said projection means to actuate one of the respective switches.

11. An electric circuit as defined in claim 10, in which said switches extend upwardly at an acute angle relative to the axis of said center, and said projection means define surfaces extending substantially parallel to said respective switches and in which said main body portion extends substantially perpendicular to said axis.

12. An electric circuit as defined in claim 11, in which said projection means include portions deformed from said main body portion towards the respective switches.

13. An electric circuit as defined in claim 12, in which said actuating plate has a central portion deformed from said main body portion to define a non-circular recess with a cooperating portion of said supporting means received in said recess and securing means cooperating with said central portion and said cooperating portion to interconnect said plate and supporting means.

14. An electric circuit as defined in claim 10, in which there are two switches extending in substantially opposite directions from said center and said plate is substantially rectangular and has opposite edges spaced from said switches and said center, and further including a support for said switches with one of said edges having a depending tab cooperating with said support for said switches to define a pivot when a force is applied to the opposite edge of said plate.

* * * * *